(No Model.)

J. MILLER.

REFRIGERATOR.

No. 264,187. Patented Sept. 12, 1882.

Witnesses:
Geo. H. Strong.
R. H. Krause.

Inventor,
James Miller
Dewey & Co.
Attorneys

N. PETERS. Photo-Lithographer. Washington. D. C.

UNITED STATES PATENT OFFICE.

JAMES MILLER, OF OAKLAND, CALIFORNIA.

REFRIGERATOR.

SPECIFICATION forming part of Letters Patent No. 264,187, dated September 12, 1882.

Application filed May 27, 1882. (No model.)

*To all whom it may concern:*

Be it known that I, JAMES MILLER, of Oakland, county of Alameda, State of California, have invented an Improved Refrigerator; and I hereby declare the following to be a full, clear, and exact description thereof.

My invention relates to the class of refrigerators; and it consists generally in the construction and arrangement of peculiar vessels providing for the holding of the substance to be kept cool, a surrounding and underlying water-space, and a water-supply.

It consists particularly in a deep water-vessel, having placed within it a tapering holding-vessel set on legs and of a diameter smaller than that of the exterior vessel, whereby an underlying and circumscribing water-space is formed, and in a peculiar water-supply vessel fitting the top of the larger vessel, all of which will hereinafter fully appear.

The object of my invention is to provide a simple, economical, and effective refrigerating device for containing any substance or article which should be kept cool.

Figure 1:
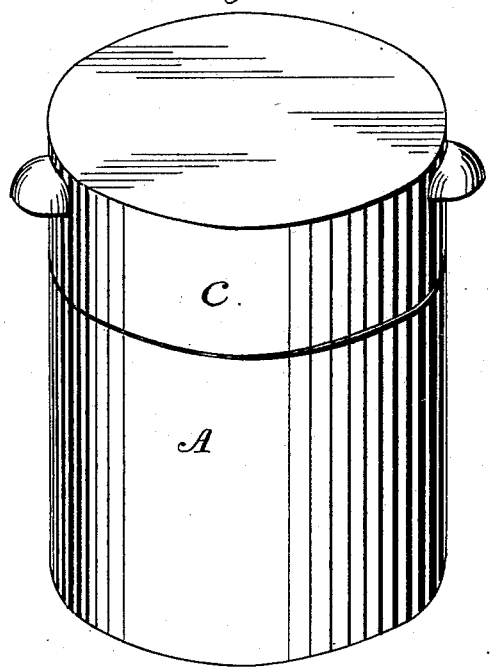
Figure 2:
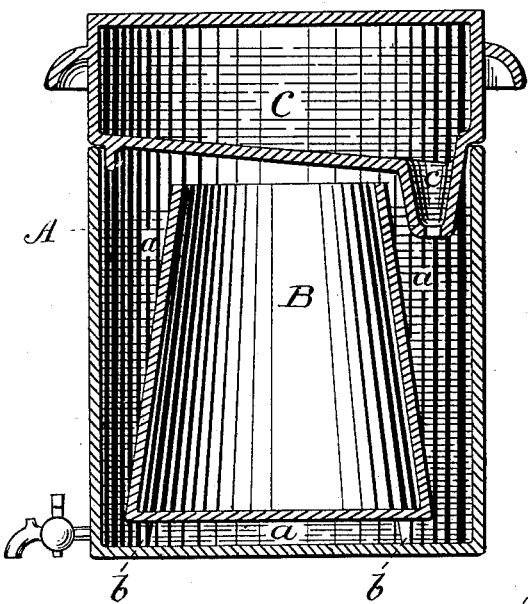

Referring to the accompanying drawings, Figure 1 is a perspective. Fig. 2 is a section.

Let A represent a deep vessel with vertical sides.

B is a tapering vessel, provided with short legs *b*, and of a diameter smaller than the vessel A in which it is placed, so that a space, *a*, is formed around and under it, as shown.

C is the water-supply vessel. This is made with a sloping or inclined bottom, and is provided with an open-ended nozzle or neck, *c*. The vessel fits upon the top of the exterior vessel, A, and its nozzle or neck projects into the water-space *a*, as shown. It is air-tight with the exception of the hole in the nozzle.

The operation is as follows: I first place the article to be kept cool within the holding-vessel B, and then fill the space *a* around and under said vessel with water nearly to its top. I fill the supply-vessel C with water through its nozzle, and then turn it down upon vessel A. Its nozzle extends down into the water in space *a*, and the air being excluded the water will not flow out as long as the mouth of the nozzle remains below the level of the water in space *a*. As evaporation takes place and the water falls in space *a* it is replenished from the supply-vessel C as long as said vessel contains any water; but the level of the water in space *a* will never rise higher than to cover the mouth of the nozzle, so that it cannot flow over into the holding-vessel B.

The device is preferably made of terra-cotta, unglazed.

The advantage of the tapering shape of vessel B is to provide space enough at the top between it and vessel A to allow the supply-vessel to easily fit its nozzle therein and to be quickly tilted to withdraw it without injury.

Having thus described my invention, what I claim as new, and desire to secure by Letters Patent, is—

A refrigerator consisting of the water-vessel A, the tapering holding-vessel B, provided with legs *b*, and of a diameter less than that of vessel A, whereby an underlying and circumscribing water-space, *a*, is formed, and the air-tight water-supply vessel C, with its sloping bottom and open-ended nozzle or neck *c* fitting down into the top of water-space *a*, substantially as and for the purpose herein described.

In witness whereof I have hereunto set my hand.

JAMES MILLER.

Witnesses:
C. D. COLE,
J. H. BLOOD.